(12) United States Patent
Kim et al.

(10) Patent No.: US 7,899,270 B2
(45) Date of Patent: Mar. 1, 2011

(54) METHOD AND APPARATUS FOR PROVIDING PANORAMIC VIEW WITH GEOMETRIC CORRECTION

(75) Inventors: Keun Ho Kim, Seoul (KR); Do Kyoon Kim, Seongnam-si (KR); Seok Yoon Jung, Seoul (KR); Hee Sae Lee, Yongin-si (KR); Anton Konouchine, Moscow (RU); Vladimir Vezhnevets, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1170 days.

(21) Appl. No.: 11/581,401

(22) Filed: Oct. 17, 2006

(65) Prior Publication Data
US 2007/0159527 A1 Jul. 12, 2007

(30) Foreign Application Priority Data
Jan. 9, 2006 (KR) ............... 10-2006-0002169

(51) Int. Cl.
*G06K 9/36* (2006.01)
*G06K 9/32* (2006.01)
*H04N 3/36* (2006.01)

(52) U.S. Cl. ............... 382/284; 382/296; 382/276; 348/97

(58) Field of Classification Search ............... None
See application file for complete search history.

(56) References Cited

U.S. PATENT DOCUMENTS 4,130,361 A * 12/1978 Humphrey ............... 356/125
5,295,488 A * 3/1994 Lloyd et al. ............... 600/410
5,329,322 A * 7/1994 Yancey ............... 351/211
5,475,803 A * 12/1995 Stearns et al. ............... 345/648

(Continued)

FOREIGN PATENT DOCUMENTS

JP 2005-44077 2/2005

OTHER PUBLICATIONS

Creating a Precise Panorama from Panned Video Sequence Images, Proceedings of the 7th Pacific Conference on Computer Graphics and Applications, Year of Publication: 1999, Xueying Qin, Eihachiro Nakamae, Katsumi Tadamura.*

(Continued)

*Primary Examiner*—Vikkram Bali
*Assistant Examiner*—Michelle Entezari
(74) *Attorney, Agent, or Firm*—Staas & Halsey LLP

(57) ABSTRACT

A method and apparatus of correcting geometric information and providing a panoramic view. In the method of providing a panoramic view, a tilting vector (X', Y') is generated by applying matrices H(a,b) and HF to a source image vector (X,Y). The matrix H(a,b) is defined by distortion angles "b" towards a plane direction and a distortion angle "a" towards a depth direction of the source image, and the matrix HF is defined according to a camera parameter matrix K. Also, a two-dimensional vector (x,y) of a source image is converted into a three-dimensional vector (X,Y,W) on a retinal image plane having a unit radial distance from an origin of a ground plane. Also, a warped image width (WIW) is estimated from a width and a field of view (FOV) of the source image. A warping vector (x',y') is generated based on the converted vector (X,Y,W) and the WIW.

14 Claims, 13 Drawing Sheets

U.S. PATENT DOCUMENTS

| | | | |
|---|---|---|---|
| 5,576,780 A * | 11/1996 | Yancey | 351/211 |
| 5,684,561 A * | 11/1997 | Yancey | 351/209 |
| 5,848,199 A * | 12/1998 | Naqvi | 382/276 |
| 6,009,190 A * | 12/1999 | Szeliski et al. | 382/154 |
| 6,044,181 A * | 3/2000 | Szeliski et al. | 382/284 |
| 6,097,854 A * | 8/2000 | Szeliski et al. | 382/284 |
| 6,441,864 B1 * | 8/2002 | Minami et al. | 348/584 |
| 6,661,930 B1 * | 12/2003 | Graham et al. | 382/276 |
| 6,989,842 B2 * | 1/2006 | Cropper et al. | 345/629 |
| 7,010,167 B1 * | 3/2006 | Ordowski et al. | 382/225 |
| 7,194,112 B2 * | 3/2007 | Chen et al. | 382/106 |
| 7,308,028 B2 * | 12/2007 | Suh | 375/240.12 |
| 7,394,946 B2 * | 7/2008 | Dewaele | 382/276 |
| 7,400,783 B2 * | 7/2008 | Sheu | 382/294 |
| 7,460,120 B2 * | 12/2008 | Yoshida et al. | 345/427 |
| 2002/0154812 A1 * | 10/2002 | Chen et al. | 382/154 |
| 2003/0117488 A1 * | 6/2003 | Pierce et al. | 348/48 |
| 2004/0032407 A1 * | 2/2004 | Ejiri et al. | 345/419 |
| 2004/0183898 A1 * | 9/2004 | Endo et al. | 348/36 |
| 2008/0031543 A1 * | 2/2008 | Nakajima et al. | 382/284 |

OTHER PUBLICATIONS

Translation for Japanese laid open 2005-44077.*

Office Action, mailed Jul. 21, 2009, in corresponding Japanese Application No. 2006-349715 (3 pp.).

* cited by examiner

METHOD AND APPARATUS FOR PROVIDING PANORAMIC VIEW WITH GEOMETRIC CORRECTION

CROSS-REFERENCE TO RELATED APPLICATIONS

This application claims the benefit of Korean Application No. 2006-2169, filed Jan. 9, 2006, in the Korean Intellectual Property Office, the disclosure of which is incorporated herein by reference.

BACKGROUND OF THE INVENTION

1. Field of the Invention

Aspects of the present invention relate to a method and apparatus of providing a panoramic view, and more particularly, to a method and apparatus of correcting geometric information with respect to tilting and warping and providing a panoramic view, and an apparatus to embody the method. In this instance, the method of correcting geometric information with respect to tilting may be applicable to other methods of stitching images and acquiring an expanded image as well as providing the panoramic view.

2. Description of the Related Art

Currently, when providing a location-based service using a popularized navigation system, a portable device, a personal digital assistant (PDA), etc., more realistic image information may be provided based on a real scene with respect to a service providing area.

As an example, as shown in FIG. 1, as a vehicle moves in the direction of A→B→C, image information for showing the way needs to change from surrounding images 111 that were taken with a rotating camera on a tripod 110 at a location X into surrounding images 121 that were taken on a tripod 120 at a location Y.

However, as shown in FIG. 2, an image 220 that was taken with a camera is slightly different from an image 210 that is seen through human eyes. Namely, as it can be seen in a picture 310 of FIG. 3, a building that is in actuality standing straight up may look crooked and distorted towards the refractive direction of a camera lens. This is because distortion effects caused by the refraction of a lens are reflected in association with an optical system, when taking a photograph of a real three-dimensional object with a camera. The distorted image 220 may be corrected to have a normal image as shown in the image 210 as seen through human eyes, by transforming the distorted image 220 as shown in an image 230. An image is distorted due to lens refraction like the distorted image 220.

Also, as shown in a picture 320 of FIG. 3, a building that is in actuality standing straight up may look distorted towards its depth direction, that is, an actually identical width of an object looks different from upward and downward directions. Also, the building may look distorted towards its plane direction, that is, an object that is in actuality standing straight up looks distorted towards its left or right direction. This distortion is due to camera slant.

However, regarding tilting correction technologies, Canon Corporation is utilizing a method of checking several points of the image 220 that was taken with a camera and rotating or translating the checked points. In this instance, since a correction with respect to a depth direction is not reflected, an image which is slightly different from a real scene may be presented as a result.

Also, Microsoft Corporation is utilizing a method of reflecting depth information and applying a perspective warping transformation. In this instance, the method may have a helpful effect with respect to objects which are located at an identical distance, but when a distance is artificially changed due to imperfect depth information, an error occurs.

Also, a method of gathering and stitching images that were taken with a rotating camera on a tripod, as shown in FIG. 1, and projecting the stitched images into images in a virtual three-dimensional cylinder shape that is estimated from one optical origin, 0, as shown in FIG. 4 is utilized to provide a panoramic view.

However, conventional warping technologies for projection onto a cylinder do not accurately project images onto the cylinder. As shown in FIG. 5, as points A through F on an image plane are projected to points a through f, an edge portion is reduced toward the inside of the cylinder. Accordingly, an object on a picture looks either too short or too large in width.

SUMMARY OF THE INVENTION

Aspects of the present invention provide a method of accurately correcting geometric information associated with tilting and warping so that a panoramic view of a real scene is normally provided. In particular, a tilting method according to aspects of the present invention may be applicable to any case of stitching and expanding at least two images as well as a panoramic view.

Aspects of the present invention also provide an apparatus that embodies the method of correcting geometric information associated with tilting and warping.

According to an aspect of the present invention, there is provided a method of providing a panoramic view, the method including: receiving a source image with respect to a plurality of pixels taken with a camera, and a location vector of each of the plurality of pixels; generating a transformation matrix for tilting the source image based on a distortion angle towards a plane direction of the source image, a distortion angle towards a depth direction of the source image, a camera parameter matrix, and a location correction matrix; and geometrically tilting the source image by obtaining a tilting vector with respect to the location vector of each pixel from the transformation matrix and relocating the source image pixels to the tilting vectors, to create a tilted source image.

According to another aspect of the present invention, the method of providing a panoramic view further includes: acquiring a warping vector based on a size and a field of view (FOV) of the source image or the tilted source image, and the camera parameter matrix; and geometrically warping the source image or the tilted source image by relocating the source image or the tilted source image pixels to the respective warping vectors, to create a warped image.

In this instance, the transformation matrix for the tilting is determined according to a matrix that is defined based on the distortion angle towards the plane direction and the distortion angle towards the depth direction, an inverse matrix of the camera parameter matrix, and the location correction matrix.

While not required in all aspects, the warping includes converting a two-dimensional location vector of the input image into a three-dimensional vector on a retinal plane having a radial distance of 1 from a center of a horizontal plane by using the camera parameter matrix, estimating a warped image width from the size of the input image, and generating the warping vector according to a defined value based on the three-dimensional vector and the warped image width. In this instance, when warping an image on the retinal image plane to a cylinder, a width of a pixel to be warped to a central angle and surrounding angles may be changed.

According to still another aspect of the present invention, there is provided a tilting apparatus to produce a panoramic view, the apparatus including: a basic transformation matrix generation unit to calculate a plurality of element values from a distortion angle towards a plane direction and a distortion angle towards a depth direction of an image and to generate a basic matrix; an inverse matrix generation unit to receive a parameter matrix of a camera that recorded the image and to generate an inverse matrix of the parameter matrix; a first multiplier to multiply the basic matrix generated in the basic transformation matrix generation unit by the inverse matrix generated in the inverse matrix generation unit; a second multiplier to multiply the parameter matrix by a matrix output from the first multiplier; a third multiplier to multiply a location correction matrix by a matrix output from the second multiplier, and to generate a final transformation matrix; and a fourth multiplier to multiply a location vector of the source image taken with the camera by the final transformation matrix output from the third multiplier, and to generate a tilting vector of the source image, wherein the source image is geometrically tilted according to the tilting vector.

According to yet another aspect of the present invention, there is provided a warping apparatus to produce a panoramic view, the apparatus including: a warping width set unit to calculate a warped image width from a width and an FOV of a source image; an angle calculation unit to calculate an angle of a left-most side pixel and an angle of a right-most side pixel with respect to a certain line, from an input size of the source image; an inverse matrix generation unit to receive a parameter matrix of a camera that recorded the image, and to generate an inverse matrix of the parameter matrix; a multiplier to multiply the inverse matrix generated in the inverse matrix generation unit by a vector based on a location vector of the source image; a tangent calculation unit to calculate an angle of a source pixel from an element value outputted from the multiplier; a first coordinate determination unit to determine a first coordinate value of a pair of coordinates of a warping vector of the source image from the angle of the source pixel that is calculated in the tangent calculation unit, using the warped image width that is calculated in the warping width set unit and the angles that are calculated in the angle calculation unit; and a second coordinate determination unit to determine a second coordinate value of the pair of coordinates of the warping vector based on element values of the output of the multiplier, wherein the source image is geometrically warped according to the warping vector.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
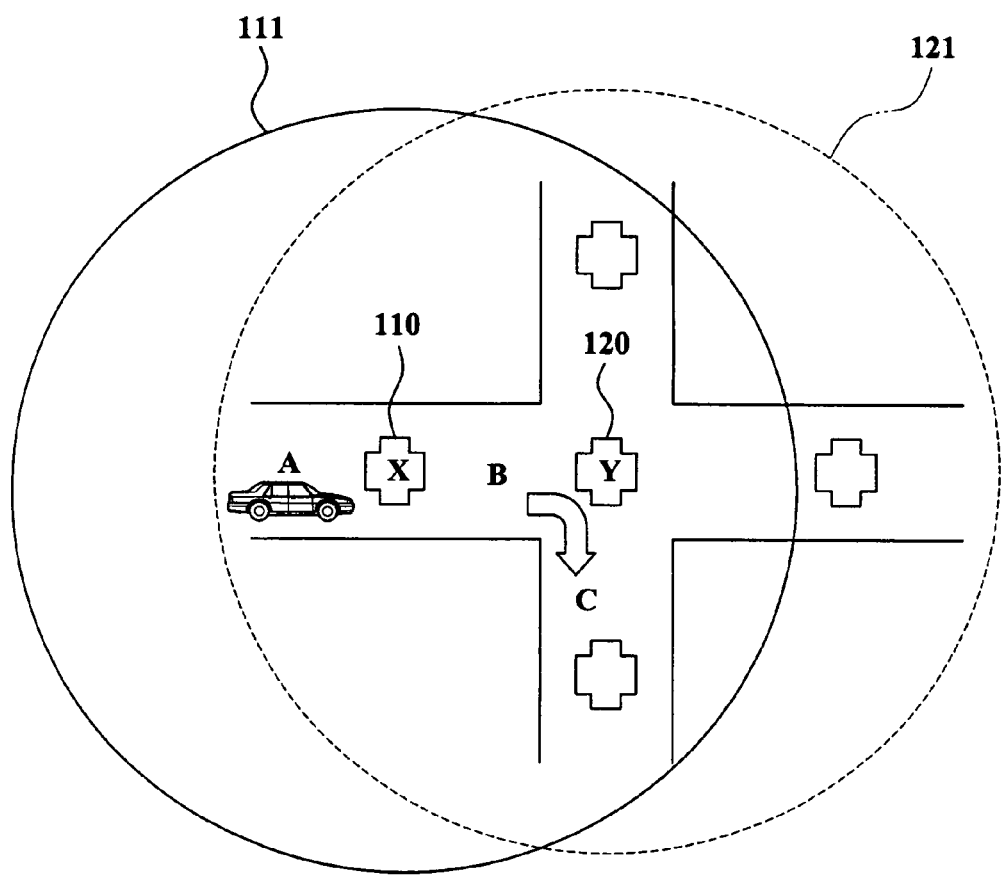
FIG. 1 is a schematic view explaining a process of recording a real scene in an intersection according to a conventional art.
Figure 2:
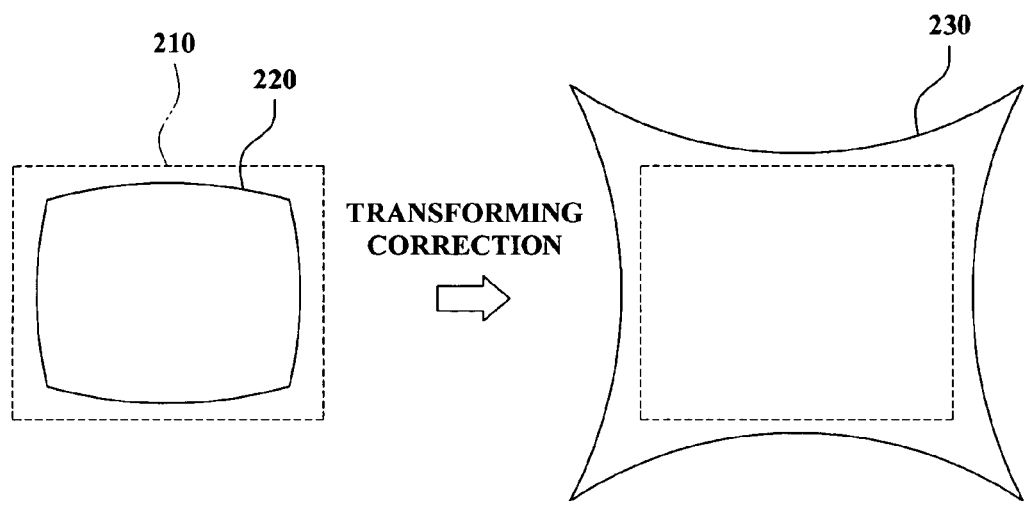
FIG. 2 is a schematic view explaining a conventional lens distortion correction technology according to a conventional art.
Figure 3:
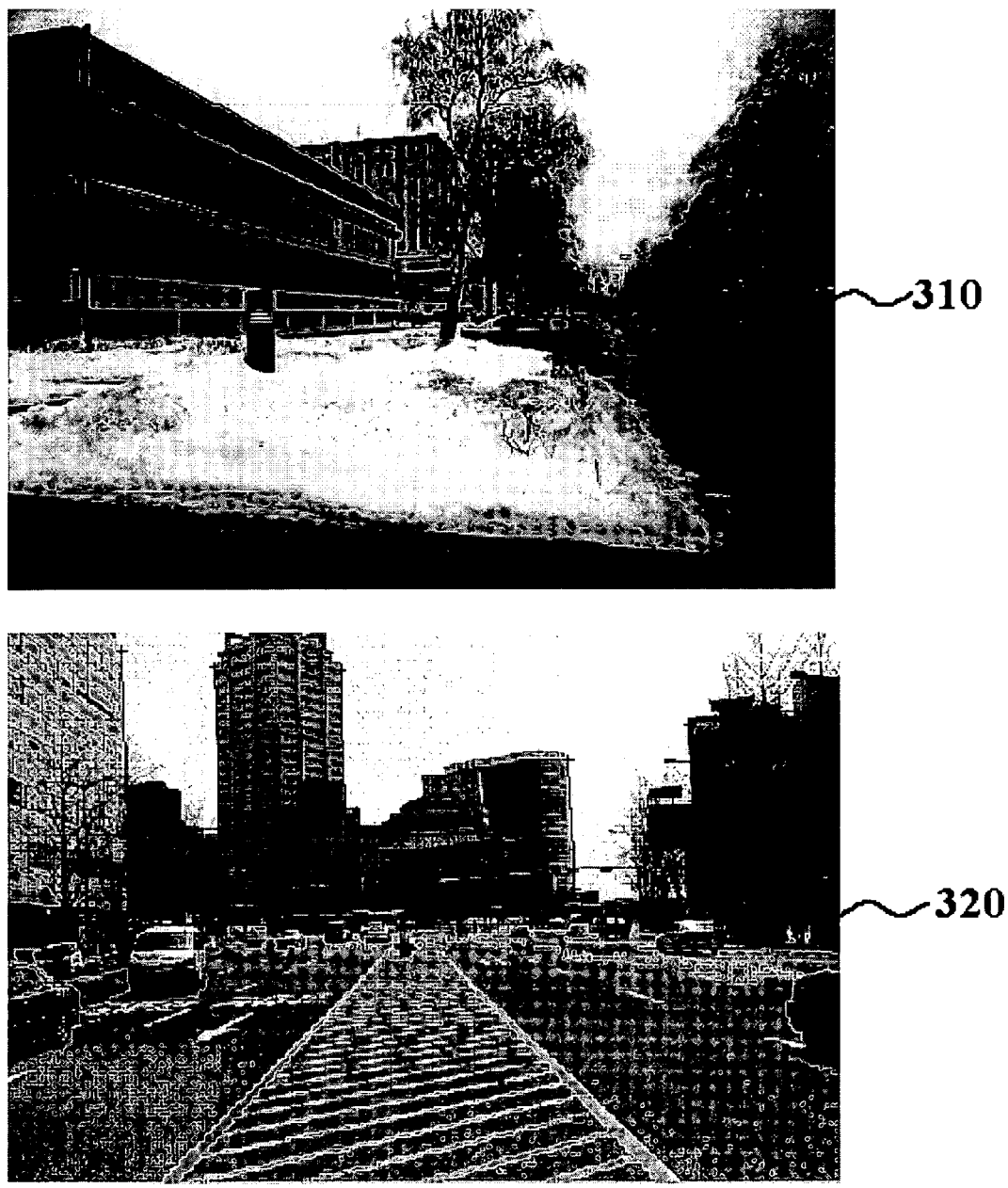
FIG. 3 illustrates an example of a distorted image by a refraction of a lens and an example of an image taken with a tilted camera according to a conventional art.
Figure 4:
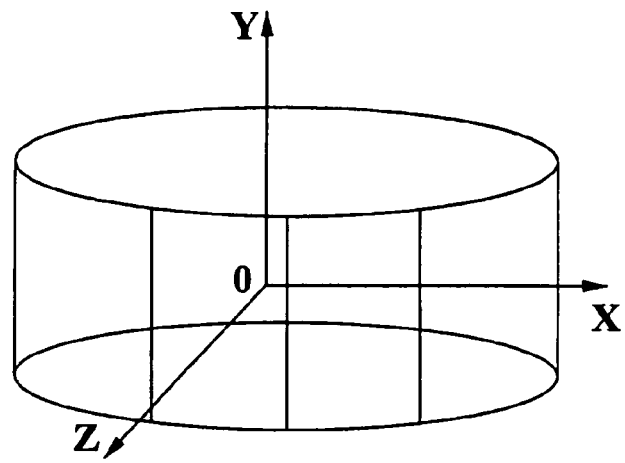
FIG. 4 is a perspective view illustrating an optical center of a panoramic view according to a conventional art.
Figure 5:
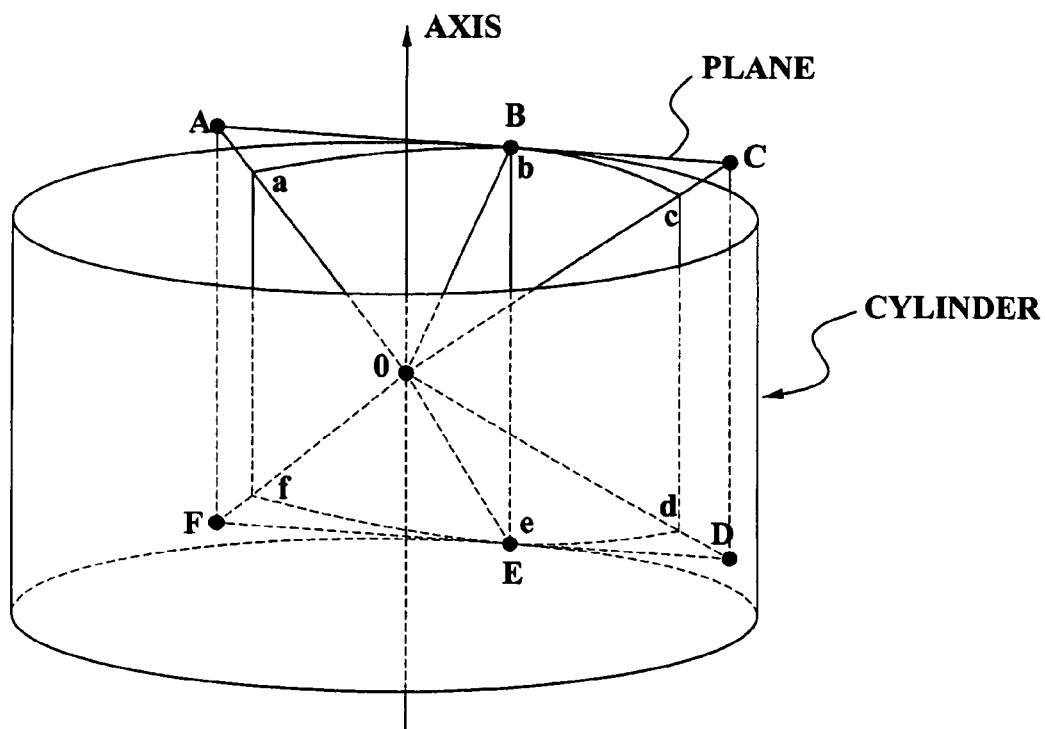
FIG. 5 is a perspective view illustrating a conventional warping technology according to a conventional art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 6:
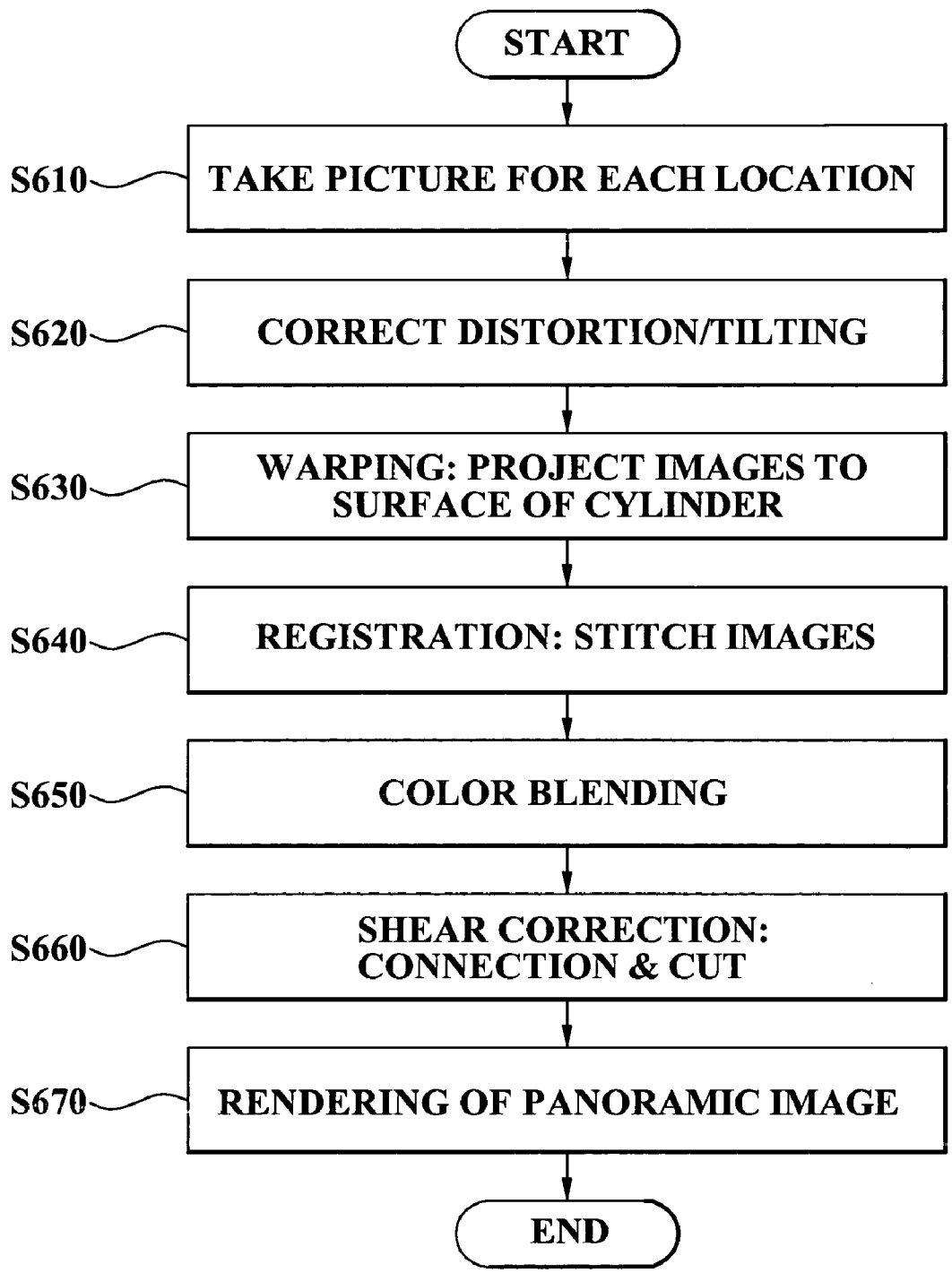
FIG. 6 is a flowchart illustrating a method of providing a panoramic view according to an embodiment of the present invention.

FIG. 6 is a flowchart illustrating a method of providing a panoramic view according to an embodiment of the present invention. When providing a location-based service to be used with a navigation system, a portable device, a personal digital assistant (PDA), etc., aspects of the present invention are based on a real scene with respect to a service providing area, so as to provide more realistic geometric image information. As an example, in operation S610, a surrounding landscape may be photographed with a plurality of cameras which are installed around an intersection on tripods, lampposts, buildings, etc., as shown in FIG. 1.

In operation S620, the distortion and/or tilting of an image taken with a camera is corrected. In this instance, an image taken with a camera is an image which was taken with a digital camera, such as a charged-couple device (CCD), a complementary-symmetry/metal-oxide semiconductor (CMOS), or the like and has a certain standard of resolution, such as a video graphic array (VGA) standard. Also, when a picture taken with an analog camera is prepared, the picture may be converted into a digital picture by a predetermined apparatus such as a scanner, digitizer, etc. Also, processing of an image may be processing of black and white digital data, but it is generally assumed that digital image data in three colors, such as red, green and blue, is processed.

Figure 9:
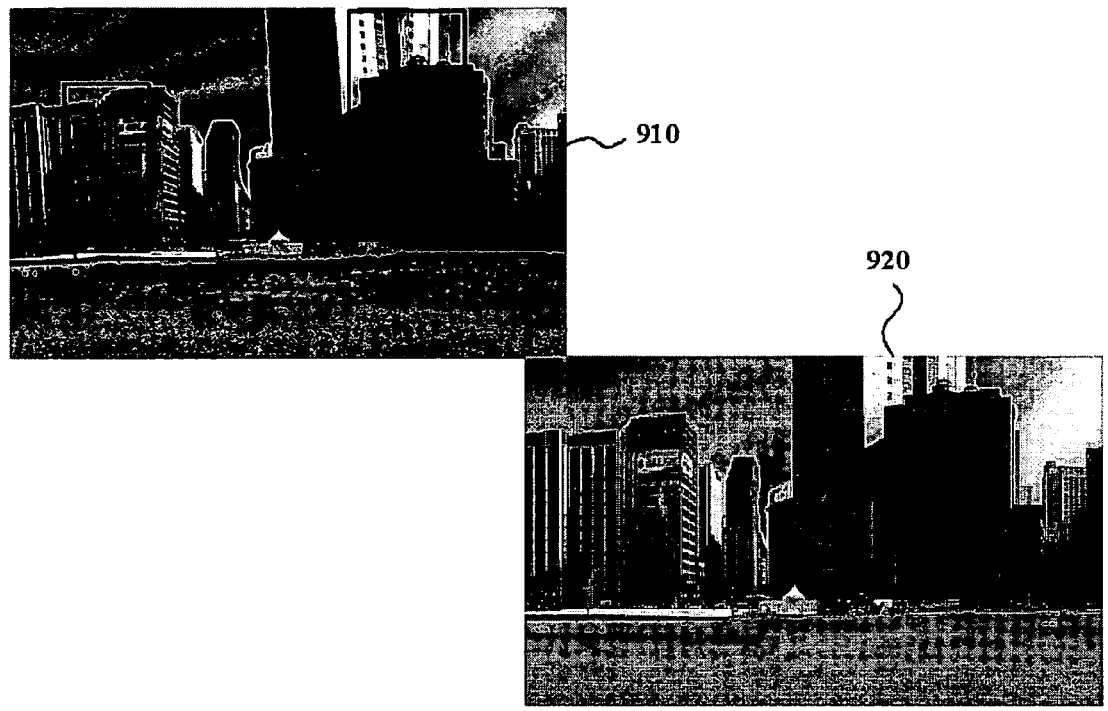
FIG. 9 illustrates a stitched image before and after tilting according to an embodiment of the present invention.

In this instance, as shown in picture 910 of FIG. 9, an image taken with the camera may look distorted towards a depth direction as if the image has a different width from upward and downward directions, i.e., a different width depending on vertical position. Also, an object that is in actuality standing straight up may look distorted towards a plane direction, as if the object is extending towards left and right directions, i.e., horizontally.

In an embodiment of the present invention, a tilting transformation matrix HF is utilized to correct image distortion/tilting. Namely, a tilting vector with respect to a location vector of an input source image may be obtained by utilizing the tilting transformation matrix HF. In this instance, the source image is geometrically tilted by relocating each pixel data of the source image to the respective tilting vector for that pixel.

Figure 7:
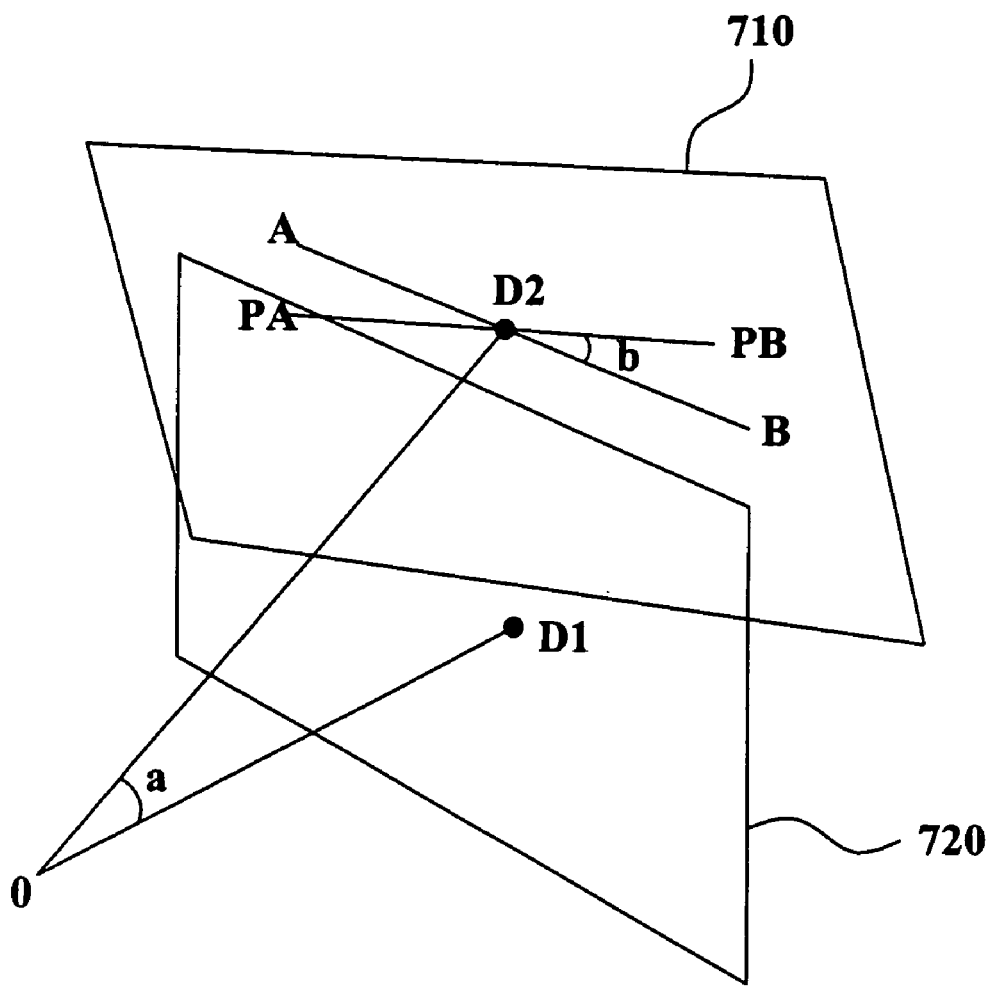
FIG. 7 is a perspective view illustrating a tilting method according to an embodiment of the present invention.

FIG. 7 is a perspective view illustrating a tilting method according to an embodiment of the present invention. Referring to FIG. 7, according to an aspect of the present invention for correcting a source image 710 to obtain a tilted image 720, thereby making the image look normal, the tilting transformation matrix HF is estimated by assuming that a distortion angle "a" and a distortion angle "b" are certain values. In this instance, the distortion angle "a" is a pitch angle when the source image 710 is distorted towards a depth direction and the distortion angle "b" is a rolling angle when the source image 710 is distorted towards a plane direction. A location D2 of each pixel is moved to a tilted location D1 by the tilting transformation matrix HF. In FIG. 7, a line between PA and PB indicates a reference line, such as a line parallel to a ground plane.

For this transformation, when the source image 710 that was taken with a camera and has a plurality of pixels is input, the tilting transformation matrix HF is generated based on the distortion angle "a" towards a depth direction of the source image 710, the distortion angle "b" towards a plane direction of the source image 710, a camera parameter matrix K, and a location correction matrix V, as shown in Equation 1 below. In Equation 1, each of the matrices, V, K, and H(a,b), is a three-dimensional square matrix.

$$HF = VKH(a,b)Inv(K) \quad \text{[Equation 1]}$$

In this instance, the transformation matrix HF according to Equation 1 is a function which changes Retinal P=Inv(K)*P, a camera retinal image point, corresponding to P(X,Y), that is, one point on the source image 710, by matrix H(a,b). Tilting may be more accurately calibrated by the camera parameter matrix K and the location correction matrix V.

Figure 8:
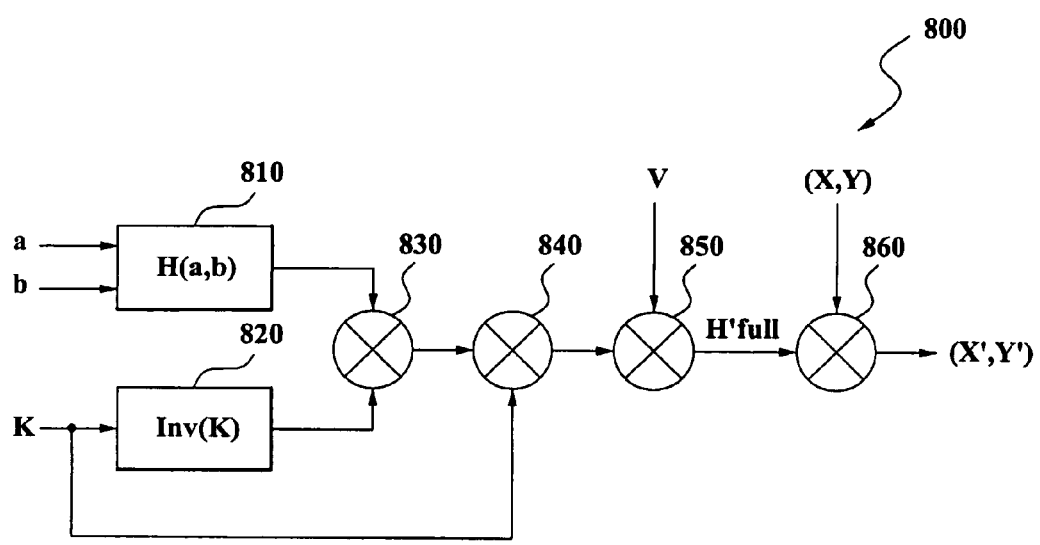
FIG. 8 is a diagram illustrating an apparatus to correct a tilting distortion according to an embodiment of the present invention.

FIG. 8 illustrates a tilting apparatus 800 according to an embodiment of the present invention, to generate the tilting transformation matrix HF and to change location (X,Y) of each pixel of the source image 710, for example, D2, to a tilting vector location (X',Y'), for example, D1. Referring to FIG. 8, the tilting apparatus 800 includes a basic transformation matrix generation unit 810, an inverse matrix generation unit 820, a first multiplier 830, a second multiplier 840, a third multiplier 850 and a fourth multiplier 860.

To generate the tilting transformation matrix HF, the basic transformation matrix generation unit 810 calculates a plurality of element values in Equation 2 from the distortion angle "b" towards the plane direction and the distortion angle "a" towards the depth direction, and also calculates basic matrix H(a,b) which is a three-dimensional square matrix, as is represented by, $$H(a,b) = \begin{bmatrix} \cos(b) & \sin(b) & 0 \\ -\cos(a)*\sin(b) & \cos(a)*\cos(b) & \sin(a) \\ \sin(a)*\sin(b) & -\sin(a)*\cos(b) & \cos(a) \end{bmatrix} \quad \text{[Equation 2]}$$

The inverse matrix generation unit 820 receives the camera parameter matrix K, as shown in Equation 3 below, and calculates an inverse matrix thereof Inv(K). In this instance, f is the camera focal length, and (cx,cy) may be any one of a center of the source image and other principal points. That is, the principle point is intrinsic to the camera and is the point in the image perpendicular to the optical axis, generally at the center of the image.

$$K = \begin{bmatrix} f & 0 & cx \\ 0 & f & cy \\ 0 & 0 & 1 \end{bmatrix} \quad \text{[Equation 3]}$$

The first multiplier 830 multiplies the basic matrix H(a,b) by the inverse matrix Inv(K). Also, the second multiplier 840 multiplies the camera parameter matrix K by a matrix output from the first multiplier 830. Accordingly, the third multiplier 850 multiplies the location correction matrix V, as shown in Equation 4 below, by a matrix output from the second multiplier 840 and obtains the tilting transformation matrix HF. In this instance, (tx,ty) are certain location values used to correct the image when camera locations are different.

$$V = \begin{bmatrix} 1 & 0 & tx \\ 0 & 1 & ty \\ 0 & 0 & 1 \end{bmatrix} \quad \text{[Equation 4]}$$

The fourth multiplier 860 multiplies the tilting transformation matrix HF by the location (X,Y) of each pixel of the source image 710 whereby the tilting vector (X',Y') of each pixel can be obtained.

By converting a location of the source image 710 to a tilting vector location according to the final transformation matrix HF, buildings in a picture may look normal without being slanted or crooked, as shown in a picture 920 of FIG. 9.

Also, in operation S630 of FIG. 6, a method of warping a tilted image is provided, which is different from the conventional art. In this instance, it may be assumed that a source image to be warped is the image which was tilted in operation S620. However, the present invention is not limited thereto. Namely, when operation S620 is omitted, an original source image may be warped.

A warping method according to an embodiment of the present invention gathers and stitches images that were taken with a rotating camera on a tripod as shown in FIG. 1 and projects the stitched images into images in a virtual three-dimensional cylinder shape that is estimated from one optical origin 0, and thereby provides a panoramic view. In this instance, in the warping method according to the present embodiment, a phenomenon that the height of an object in a picture looks too short or too large, i.e., wide, as an edge portion due to scaling when reduced to the inside of the cylinder, does not occur.

Figure 10:
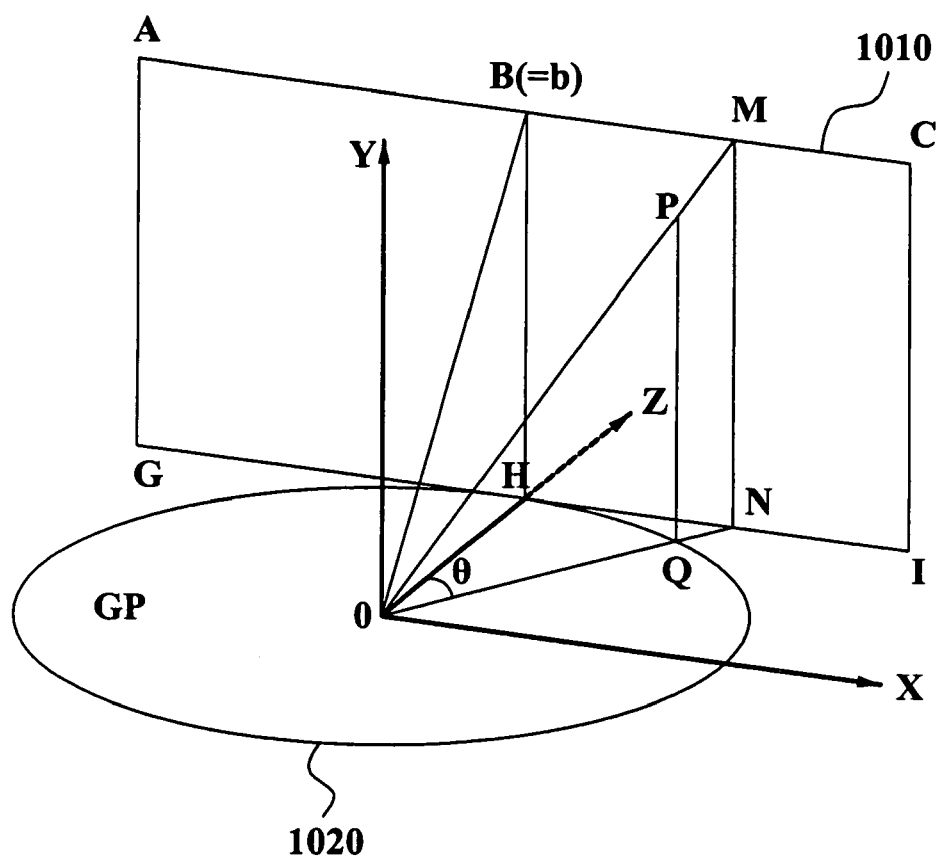
FIG. 10 is a perspective view explaining a method of projecting a three-dimensional image onto a cylinder according to an embodiment of the present invention.

FIG. 10 is a perspective view explaining a method of projecting a three-dimensional image to a cylinder for warping. Referring to FIG. 10, in the present invention for correcting a retinal image plane 1010 to a warped image on a cylinder 1020 and making an image look normal, with the assumptions that the retinal image plane 1010 is cut at some distance from an origin 0 of the cylinder 1020 and viewed from the origin 0 of a ground plane GP, a three-dimensional vector M(X,Y,W) on the retinal image plane 1010 is a vector that points according to (X,Y,Z) on a plane of a source image which is calculated as a retinal image plane 1010. Also, a warped image width (WIW) from a source image size (width/height) is estimated by utilizing predetermined header information with respect to an image. Accordingly, location vector M(x,y) is moved to the warped location P(x', y') on the cylinder 1020 whose radial distance is 1 (OH=1: unit distance) from the origin 0, according to a value defined based on the three-dimensional vector which is moved on the retinal image plane 1010 and the WIW.

In an embodiment of the present invention, the WIW is estimated based on the source image size (width/height) to reduce the source image in a horizontal direction. Accordingly, an image which may look too short or too wide when warping the retinal image plane 1010 to the surface of the cylinder 1020, can look normal. On the other hand, in the conventional warping method, since a number of horizontally mapping pixels per angle in an edge portion of an image is different from a number of horizontally mapping pixels per angle in a center portion of the image, an object in the image look shorter and wider than it actually is. However, aspects of the present invention solve this problem.

For this case, when the source image that was taken with the camera and has a plurality of pixels is input, a warping vector (x', y') is obtained based on the size (width/height) of the source image, two pixel locations approximately at a center of the source image and the camera parameter matrix K, and the source image is geometrically warped by relocating the source image pixels to the warping vector (x', y').

Figure 11:
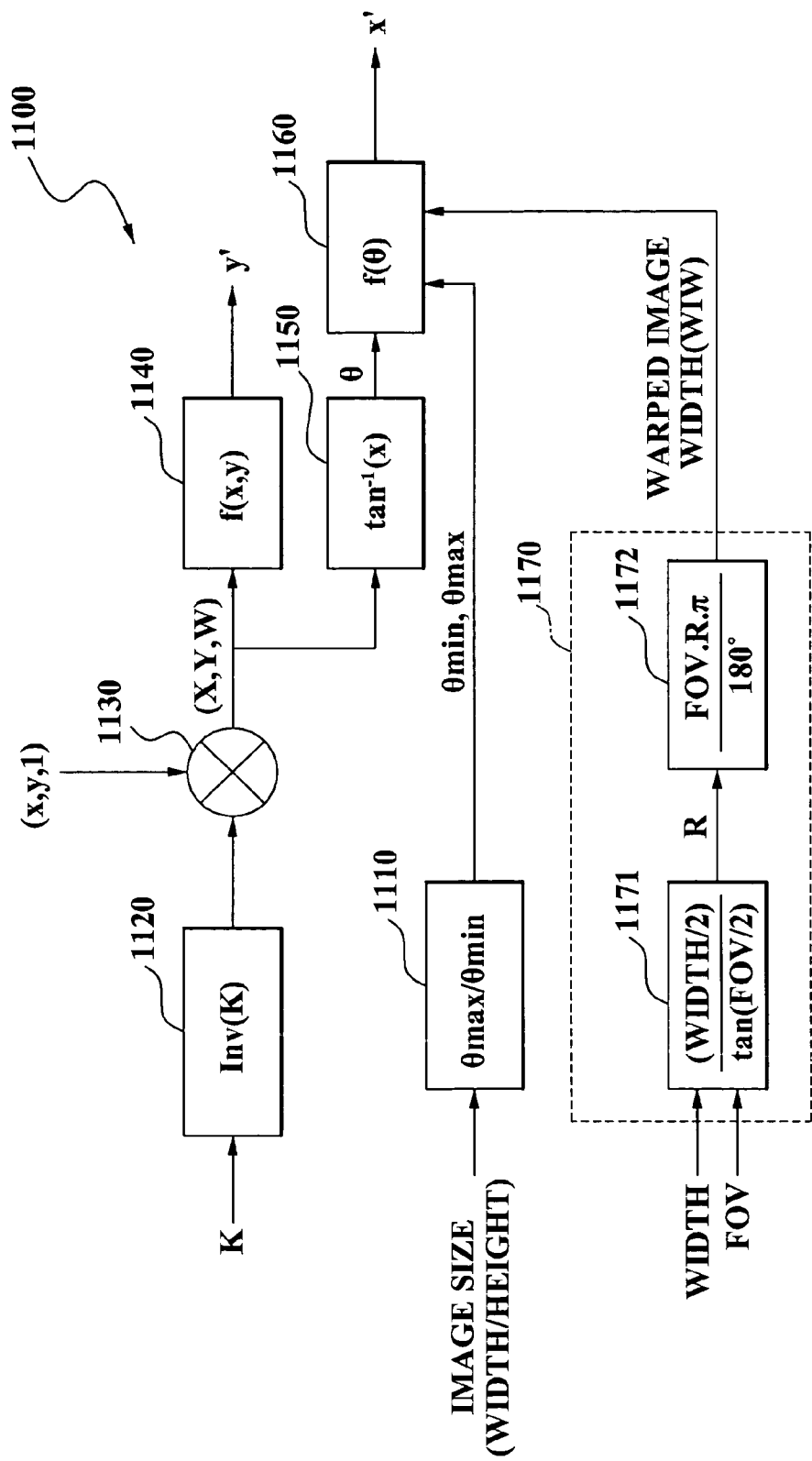
FIG. 11 is a diagram illustrating an example of an apparatus to correct a warping distortion according to an embodiment of the present invention.

FIG. 11 illustrates a warping apparatus 1100 according to an embodiment of the present invention. In this instance, the warping apparatus 1100 may convert the two-dimensional location vector (x,y) of the source image into a three-dimensional vector (X,Y,W) on a retinal image plane, estimate a WIW from an image size, and obtain a warping vector (x',y') according to values which are defined based on the converted three-dimensional vector (X,Y,W) and the WIW.

Referring to FIG. 11, the warping apparatus 1100 includes an angle calculation unit 1110, an inverse matrix generation unit 1120, a multiplier 1130, an x' coordinate determination unit 1160, a y' coordinate determination unit 1140, a tangent calculation unit 1150, and a warping width set unit 1170.

The warping width set unit 1170 calculates the WIW from a width and a field of view (FOV) of the source image. Namely, a resolution calculation unit 1171 of FIG. 11 calculates a radius R from the width and the FOV of the source image. In this instance, the resolution calculation unit 1171 may calculate the radius R by dividing a half of the width of the source image (WIDTH/2) by a tangent value of FOV/2. Also, a width determination unit 1172 of FIG. 11 may multiply the FOV of the camera and the radius R, and convert the result of the multiplication into a radian value and determine the radian value as the WIW.

The angle calculation unit 1110 calculates an angle of a left-most side pixel a min and an angle of a right-most side pixel θ max with respect to a central line of the source image, from an input size (width/height) of the source image. The calculated angles are angles that are viewed from an origin 0 of the ground plane GP.

The inverse matrix generation unit 1120 receives the camera parameter matrix K as shown in Equation 3 and generates an inverse matrix thereof, Inv(K). The multiplier 1130 multiplies the inverse matrix Inv(K) that is generated in the inverse matrix generation unit 1120 by a vector (x,y,1) based on the location vector of the source image. Accordingly, the three-dimensional vector (X,Y,W) on the retinal image plane 1010, which is in parallel with the source image, is obtained by, $$\begin{bmatrix} X \\ Y \\ W \end{bmatrix} = K^{-1} \begin{bmatrix} x \\ y \\ 1 \end{bmatrix} \quad \text{[Equation 5]}$$

The tangent calculation unit 1150 calculates an angle of a source image pixel x from an element value X of an output of the multiplier 1130. Accordingly, as shown in Equation 6 below, the x' coordinate determination unit 1160 calculates f(θ) from the angle θ of the source image pixel x that is calculated in the tangent calculation unit 1150, then using the WIW that is calculated in the warping width set unit 1170 and the angles θ min and θ max that are calculated in the angle calculation unit 1110, the x' coordinate determination unit 1160 determines a coordinate value x' of the warping vector of the source image pixel. Through this warping apparatus 1100, a number of horizontally mapped pixels per angle in an edge portion of an image may be adjusted to become substantially identical to a number of horizontally mapped pixels per angle in a center portion of the image.

$$\theta = \tan^{-1}(X), \; v = \frac{Y}{\sqrt{X^2 + 1^2}} \quad \text{[Equation 6]}$$

$$f(\theta) = \frac{\theta - \theta_{min}}{\theta_{max} - \theta_{min}}$$

$$x' = \frac{\theta - \theta_{min}}{\theta_{max} - \theta_{min}} * WarpedImageWidth$$

$$y' = v$$

Figure 12:
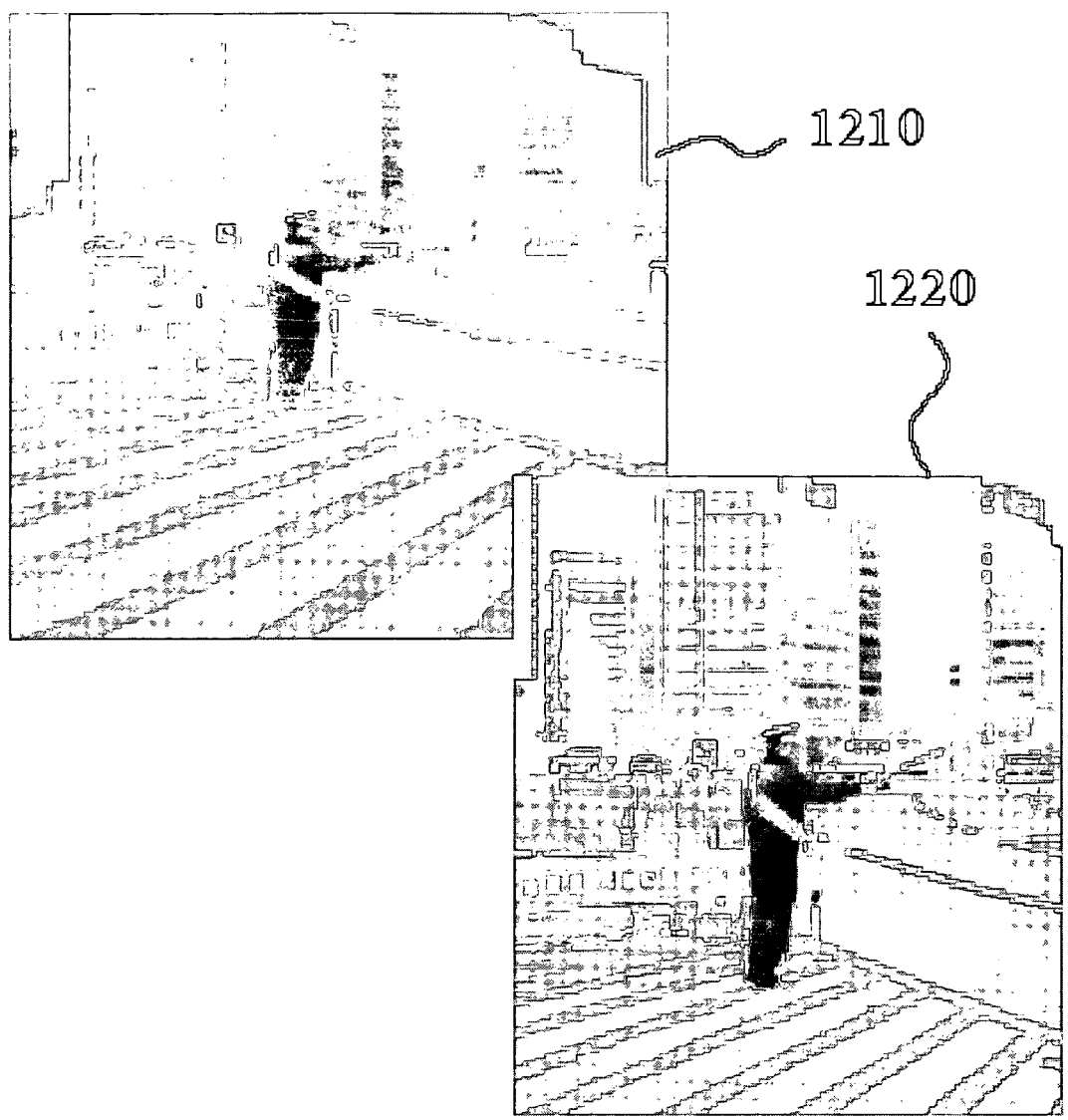
FIG. 12 illustrates an image before and after width direction correction according to an embodiment of the present invention.

As shown in Equation 6 above, the y' coordinate determination unit 1140 determines another coordinate value y' of the warping vector based on element values of the output of the multiplier 1130. While the location (x,y) of each pixel of the source image is converted into a new location by the warping vector (x', y'), a figure and buildings in the final image may look normal as shown in a picture 1220 of FIG. 12.

An original source image, a tilted, and/or a warped image according to the above-described technology may be further processed in a subsequent processor.

Figure 13:
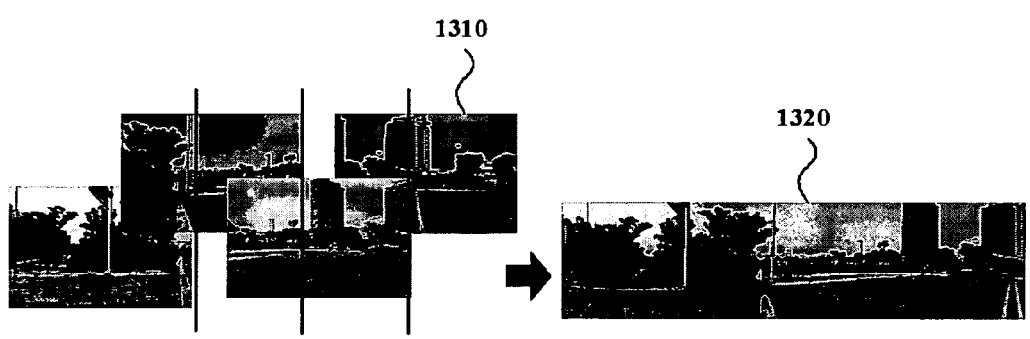
FIG. 13 illustrates an image stitching according to an embodiment of the present invention.

FIG. 13 illustrates an image stitching which can be subsequently performed according to an embodiment of the present invention. As an example, in operation S640 of FIG. 6, images that were taken with a camera so as to provide a panoramic image are collected on a virtual cylinder and registered as described above. In this instance, as shown in pictures 1310 of FIG. 13, a method of overlapping two successive images by ¼ to ¾, i.e., 25 to 75%, of the width of each of the images and 0 to ⅛, i.e., 0 to 12.5% of the height of each of the images, and finding a location where a sum of square difference (SSD) value of data is a minimum may be utilized. Namely, when images are stitched in a location where a difference between two image data is a minimum, as shown in a picture 1320 of FIG. 13, a panoramic image may be completed.

Figure 14:
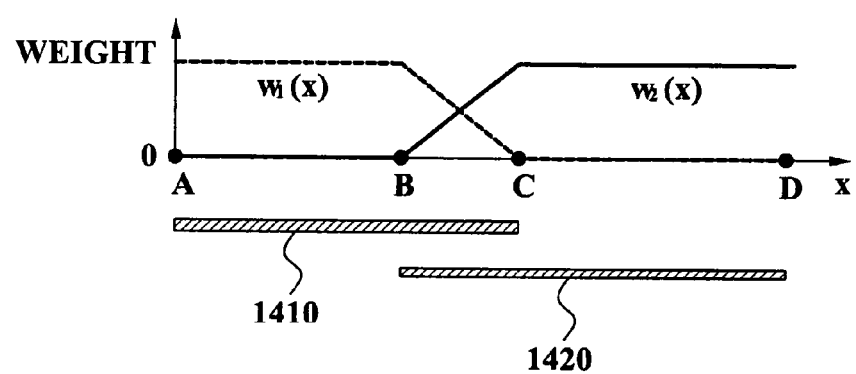
FIG. 14 is a diagram explaining color blending according to an embodiment of the present invention.

FIG. 14 is a diagram explaining color blending which may be subsequently performed according to an embodiment of the present invention. When stitching images as shown in FIG. 13, color information of an overlapped portion between two images may radically change due to an environmental difference when the images were taken. In this instance, in operation S650 of FIG. 6, the two images may be smoothly stitched through color blending with respect to the overlapped portion. As an example, in FIG. 14, in a process of stitching a first image 1410 that has a width from A to C and a second image 1420 that has a width from B to D, linear weights $w_1(x)$ and $w_2(x)$ are respectively given to both image data with respect to an overlapped portion of the two images between B and C.

Figure 15:
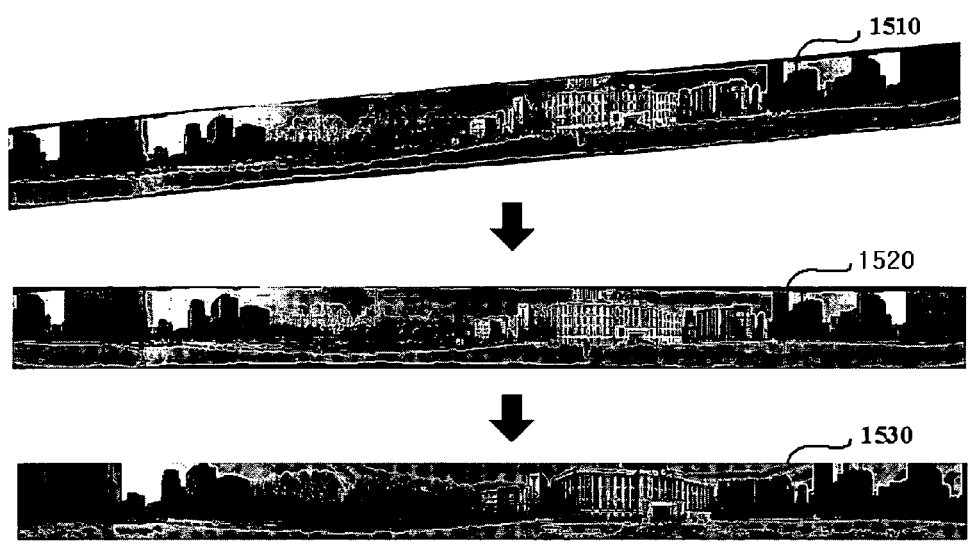
FIG. 15 illustrates a shear correction according to an embodiment of the present invention.

FIG. 15 illustrates a shear correction according to an embodiment of the present invention. After stitching or color blending with respect to images moved onto a cylinder as described above, in operation S660 of FIG. 6, a corresponding panoramic image may be slightly slanted towards left and right directions and a noise may be included in upper and lower portions, as shown in a picture 1510 of FIG. 15. In this instance, when rolling the panoramic image to be a cylindrical shape, a slope of the panoramic image is adjusted so that a starting point and an ending point meet each other as shown in a picture 1520 of FIG. 15. Also, as shown in a picture 1530 of FIG. 15, an overlapped image is cut and the noise image is thrown away in order to make a stitched image of a shape of a rectangle.

When a tilting correction, warping, image stitching, color blending, and shear correction with respect to an image source are processed so as to provide a panoramic image, the processed image data may be stored in a database in a predetermined memory, such as a navigation system, a portable device, a PDA, and the like. In operation S670 of FIG. 6, when providing a location-based service, a clean panoramic image may be provided on a liquid crystal display (LCD), for example, through rendering.

As described above, in a method of providing a panoramic view according to an embodiment of the present invention, a tilting vector (X', Y') is generated by applying a matrix H(a,b) and a matrix HF to a source image vector (X, Y) in which the matrix H(a,b) is defined based on a distortion angle "b" towards a plane direction and a distortion angle "a" towards a depth direction, and the matrix HF is defined according to a camera parameter matrix K. Also, a two-dimensional vector (x,y) of a source image is converted into a three-dimensional vector (X,Y,W) on a retinal image plane contacting a cylinder and having unit radial distance from an origin of a ground plane. Also, a WIW is estimated from a width and a FOV of a source image. A warping vector (x', y') is generated according to a value that is defined based on the converted vector (X,Y,W) and the WIW.

As described above, in a method and apparatus of providing a panoramic view according to aspects of the present invention, geometric information associated with tilting and warping is precisely corrected with respect to data of images that were taken with a rotating camera in an intersection and the like. Accordingly, a more natural and realistic image may be provided. The more natural and realistic image may be useful in image recognition and object recognition software. The tilting method described above may be applicable to a panoramic view and any case of stitching at least two images. Accordingly, the tilting method according to the present invention may be applicable to image data processing in a navigation system, a portable device, a PDA and the like and provide a location-based service together with a more accurate and vivid image.

Aspects of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Also, aspects of the invention may be embodied in computer readable code embodied as a computer data signal in a carrier wave, such as data transmission through the Internet. The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing a panoramic view, the method comprising:

receiving a source image with respect to a plurality of pixels taken with a camera, and a location vector of each of the plurality of pixels;

generating a transformation matrix for tilting the source image based on a distortion angle towards a plane direction of the source image, a distortion angle towards a depth direction of the source image, a camera parameter matrix and a location correction matrix; and geometrically tilting the source image by obtaining a tilting vector with respect to the location vector from the transformation matrix and relocating the pixels of the source image to the tilting vector.

2. The method of claim 1, wherein the transformation matrix is determined according to a matrix that is defined based on the distortion angle towards the plane direction and the distortion angle towards the depth direction, an inverse matrix of the camera parameter matrix and the location correction matrix.

3. The method of claim 1, wherein the generating of the transformation matrix comprises:

generating a basic matrix by calculating a plurality of element values from the distortion angle towards the plane direction and the distortion angle towards the depth direction;

generating an inverse matrix of the camera parameter matrix;

multiplying the basic matrix by the inverse matrix to obtain a first multiplication result;

multiplying the camera parameter matrix by the first multiplication result to obtain a second multiplication result; and generating a final transformation matrix by multiplying the location correction matrix by the second multiplication result to generate a final transformation matrix.

4. The method of claim 1, wherein the transformation matrix for tilting is determined by equation, $$HF=VKH(a,b)Inv(K)$$

where HF is the transformation matrix, K is the camera parameter matrix, V is the location correction matrix, Inv(K) is an inverse matrix of K, H(a,b) is a basic transformation matrix, "a" is a distortion angle towards a depth direction and "b" is a distortion angle towards a plane direction of the source image.

5. The method of claim 4, wherein each of the matrices V, K, and H(a,b) is a three-dimensional square matrix.

6. The method of claim 4, wherein the equation is adopted by, $$H(a,b) = \begin{bmatrix} \cos(b) & \sin(b) & 0 \\ -\cos(a)*\sin(b) & \cos(a)*\cos(b) & \sin(a) \\ \sin(a)*\sin(b) & -\sin(a)*\cos(b) & \cos(a) \end{bmatrix}$$

$$K = \begin{bmatrix} f & 0 & cx \\ 0 & f & cy \\ 0 & 0 & 1 \end{bmatrix}$$

$$V = \begin{bmatrix} 1 & 0 & tx \\ 0 & 1 & ty \\ 0 & 0 & 1 \end{bmatrix}$$

where f is the camera focal length, (cx,cy) is any one of a center of the source image and other principal points, and (tx,ty) is a certain value for correction for each camera location.

7. The method of claim 1, further comprising:
acquiring a warping vector based on a size and a field of view (FOV) of the source image or the tilted source image, and the camera parameter matrix; and
geometrically warping the source image or the tilted source image by relocating pixels of the source image or the tilted source image to the warping vector, to obtain the warped image.

8. The method of claim 7, further comprising:
estimating a warped image width from the size of the input image;
converting the two-dimensional location vector of the input image to be warped into a three-dimensional vector on a retinal image plane contacting a cylinder and having a unit radial distance from an origin of a ground plane by using the camera parameter matrix and the warped image width; and
generating the warping vector according to a defined value based on the three-dimensional vector and the warped image width.

9. The method of claim 7, wherein the acquiring of the warping vector comprises:
calculating a warped image width from a width and the FOV of the input image to be warped;
calculating an angle of a left-most side pixel and an angle of a right-most side pixel with respect to a certain line, from the size;
calculating an inverse matrix of the camera parameter matrix;
multiplying the inverse matrix by a vector based on the location vector of the pixel of the input image to be warped to obtain an element value;
calculating an angle of the source image pixel from the element value associated with that pixel;
determining a first coordinate value of a pair of coordinates of the warping vector from the angle of the source image pixel using the warped image width and the angle of the left-most side pixel and the angle of the right-most side pixel with respect to the certain line; and
determining a second coordinate value of the pair of coordinates of the warping vector based on the element value.

10. The method of claim 9, wherein the warped image width is calculated from locations of a central pixel of the input image and a horizontally adjacent pixel of the central pixel.

11. The method of claim 9, wherein the certain line for calculating the angle of the left-most side pixel and the angle of the right-most side pixel is a central line of the input image.

12. The method of claim 7, wherein the warping vector is determined by, $$\begin{bmatrix} X \\ Y \\ W \end{bmatrix} = K^{-1} \begin{bmatrix} x \\ y \\ 1 \end{bmatrix}$$

$$\theta = \tan^{-1}(X), \; v = \frac{Y}{\sqrt{X^2 + 1^2}}$$

$$x' = \frac{\theta - \theta_{min}}{\theta_{max} - \theta_{min}} * WarpedImageWidth$$

$$y' = v$$

where (x,y) is the two-dimensional location vector of the input image pixel for warping, (X,Y,W) is a three-dimensional vector on a retinal plane having a unit radial distance from an origin of a ground plane, WarpedImageWidth is a width of a warped image, and (x',y') is the warping vector.

13. The method of claim 7, further comprising:
processing the image that is tilted or warped by at least one of stitching, color blending, and shear correcting; and
rendering the image that is further processed.

14. A non-transitory computer readable recording medium storing a program for implementing the method of claim 1.

* * * * *

UNITED STATES PATENT AND TRADEMARK OFFICE
CERTIFICATE OF CORRECTION

| | | |
|---|---|---|
| PATENT NO. | : 7,899,270 B2 | |
| APPLICATION NO. | : 11/581401 | |
| DATED | : March 1, 2011 | |
| INVENTOR(S) | : Keun Ho Kim et al. | |

It is certified that error appears in the above-identified patent and that said Letters Patent is hereby corrected as shown below:

Column 12, Line 39-40, In Claim 12, delete "WarpedlmageWidth" and insert --WarpedImageWidth--, therefor.

Signed and Sealed this
Third Day of May, 2011

David J. Kappos
*Director of the United States Patent and Trademark Office*